United States Patent
Gotanda (10) Patent No.: US 7,652,714 B2
(45) Date of Patent: Jan. 26, 2010

(54) IMAGING DEVICE AND IMAGE PROCESSING METHOD

(75) Inventor: Yoshiharu Gotanda, Yokohama (JP)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 476 days.

(21) Appl. No.: 11/545,174

(22) Filed: Oct. 10, 2006

(65) Prior Publication Data

US 2007/0116382 A1     May 24, 2007

(30) Foreign Application Priority Data

Nov. 21, 2005   (JP) ............................. 2005-336082

(51) Int. Cl.
   *H04N 5/232*  (2006.01)
   *G03B 13/00*  (2006.01)
   *H04N 5/262*  (2006.01)

(52) U.S. Cl. ................. 348/345; 348/354; 348/356; 348/240.99; 348/240.2

(58) Field of Classification Search .......... 348/354, 348/355, 356
See application file for complete search history.

(56) References Cited

U.S. PATENT DOCUMENTS 6,512,637 B1 *  1/2003  Tomita ................... 359/686

FOREIGN PATENT DOCUMENTS

| JP | 63-191112 A | 8/1988 |
|----|-------------|--------|
| JP | 11023949 A * | 1/1999 |
| JP | 2000041162 A * | 2/2000 |
| JP | 2002182302 A * | 6/2002 |

OTHER PUBLICATIONS

Office Action established for CN 2006101463970.

* cited by examiner

*Primary Examiner*—Sinh Tran
*Assistant Examiner*—Wanda M Negron
(74) *Attorney, Agent, or Firm*—Drinker Biddle & Reath LLP (57) ABSTRACT

An imaging device is provided. The imaging device can maintain a constant angle of view even if a focal distance of an entire lens system changes as a focusing lens moves. The imaging device includes an image sensor, a focusing lens, a lens driver, an image generator, a magnification changing rate obtaining unit, and a size changer. The image sensor shoots a snap shot of an object, and the focusing lens performs focusing on the object. The lens driver drives the focusing lens to a plurality of focal points for the object, and the image generator generates an image on the basis of a photograph signal from the image sensor. The magnification changing rate obtaining unit obtains a magnification changing rate for each focal point such that an angle of view for each image photographed at each focal point of the focusing lens is maintained constant. The size changer changes the size of the image on the basis of the magnification changing rate.

17 Claims, 10 Drawing Sheets

| POSITION OF FOCUSING LENS | SHOOTING MAGNIFICATION | RESIZE REDUCTION RATE |
|---|---|---|
| 0 | 1.10 | 0.91 |
| 1 | 1.09 | 0.92 |
| 2 | 1.08 | 0.93 |
| 3 | 1.07 | 0.93 |
| 4 | 1.06 | 0.94 |
| 5 | 1.05 | 0.95 |
| 6 | 1.04 | 0.96 |
| 7 | 1.03 | 0.97 |
| 8 | 1.02 | 0.98 |
| 9 | 1.01 | 0.99 |
| 10 | 1.00 | 1 |

FREQUENCY OF NEAR POS.: HIGH

FREQUENCY OF FAR POS.: LOW

FOCUSING LENS MOVES

FREQUENCY OF NEAR POS.　　　　　　　　FREQUENCY OF FAR POS.

FOCUSING LENS MOVES

FIG. 12

IMAGING DEVICE AND IMAGE PROCESSING METHOD

CROSS-REFERENCE TO RELATED PATENT APPLICATION

This application claims the benefit of Japanese Patent Application No. 2005-0336082, filed on Nov. 21, 2005, in the Japanese Intellectual Property Office, the disclosure of which is incorporated herein in its entirety by reference.

BACKGROUND OF THE INVENTION

1. Field of the Invention

The present invention relates to an imaging device and an image processing method.

2. Description of the Related Art

In imaging devices such as still cameras there has been a problem in that when focusing is performed at a very long or short distance by a focusing lens of a lens optical system, an angle of view changes in order to vary a focal distance of an entire lens system.

One imaging device capable of solving this problem and that is able to maintain a constant angle of view is disclosed in Japanese Patent No. 2503442 and includes a correction apparatus that is additionally added to a lens optical system to maintain a constant focal distance of an entire lens system regardless of a focus position of the focus lens.

However, as disclosed in Japanese Patent No. 2503442, a cylindrical barrel containing a lens is large and the number of lenses that are driven in the cylindrical barrel increases to the extent that a much greater driving torque is required. Therefore, it is difficult to manufacture a lightweight and small-sized imaging device that maintains a constant angle of view.

SUMMARY OF THE INVENTION

The present invention provides a small-sized and light weight imaging device and an image processing method that are capable of maintaining a constant angle of view even when a focal distance of an entire lens system changes depending on movements of a focusing lens.

According to an aspect of the present invention, there is provided an imaging device including: an image sensor photographing an object; a focusing lens focusing on the object; a lens driver at least driving the focusing lens to a plurality of focal points for the object; an image generator generating an image on the basis of a photograph signal from the image sensor; a magnification changing rate obtaining unit obtaining a magnification changing rate for each focal point such that an angle of view for each image photographed at each focal point of the focusing lens is maintained constant; a size changer changing the size of the image on the basis of the magnification changing rate; and an output unit outputting the size changed image, which is changed by the size changer.

The imaging device obtains a magnification changing rate to output an image whose size has been changed. Therefore, since the magnification changing rate is calculated such that an angle of view is constant regardless of a focal point of the focusing lens, the angle of view of the image whose size has been changed depending on the magnification changing rate is maintained constant.

The output unit may be a display unit displaying the changed image on a screen.

According to another aspect of the present invention, there is provided an imaging device including: a focusing lens focusing on the object; a lens driver at least driving the focusing lens to a plurality of focal points for the object; an image generator generating an image on the basis of a photograph signal from the image sensor; a magnification changing rate obtaining unit obtaining a magnification changing rate for each focal point such that an angle of view for each image photographed at each focal point of the focusing lens is maintained constant; a size changer changing the size of the image on the basis of the magnification changing rate; and an automatic focus controller extracting a predetermined frequency component of the size changed image output of the size changer, and which automatically determines a focal point of the focusing lens.

The predetermined frequency component may be a high frequency component.

The automatic focus controller may calculate, for each focal point, an integrated value obtained by integrating a high frequency component of each pixel formed on a predetermined region of the changed image, and determine a focal point that corresponds to a largest integrated value of obtained integrated values as a focal point.

According to another aspect of the present invention, there is provided an imaging device including: a focusing lens focusing on the object; a lens driver at least driving the focusing lens to a plurality of focal points for the object; an image generator generating an image on the basis of a photograph signal from the image sensor; a magnification changing rate obtaining unit obtaining a magnification changing rate for each focal point such that an angle of view for each image photographed at each focal point of the focusing lens is maintained constant; a size changer changing the size of the image on the basis of the magnification changing rate; and an automatic exposure controller extracting a predetermined brightness component of the size changed image output of the size changer, and which automatically calculates an exposure on the basis of the predetermined brightness component.

The automatic exposure controller may calculate brightness values of all pixels constituting the size changed image, integrate the calculated brightness values to calculate an integrated value, and determine the exposure such that the integrated value is maintained constant.

According to another aspect of the present invention, there is provided an image displaying method including: obtaining a magnification changing rate for each focal point such that an angle of view for each image photographed at each focal point of a focusing lens is maintained constant, the focusing lens having a plurality of focal points for an object; changing the size of the image on the basis of the magnification changing rate; and displaying an image changed during the changing of the size on a screen.

According to another aspect of the present invention, there is provided an image processing method comprising: obtaining a magnification changing rate for each focal point such that an angle of view for each image photographed at each focal point of a focusing lens is maintained constant, whereby the focusing lens comprises a plurality of focal points for an object; changing the size of the image on the basis of the magnification changing rate; extracting a predetermined frequency component of the changed image whose size has been changed during the changing of the size, and determining a focal point of the focusing lens; and driving the focusing lens up to the focal point.

According to another aspect of the present invention, there is provided an image processing method including: obtaining a magnification changing rate for each focal point such that an angle of view for each image photographed at each focal point of a focusing lens is maintained constant, wherein the focusing lens comprises a plurality of focal points for an object;

changing the size of the image on the basis of the magnification changing rate; extracting a predetermined brightness component of a changed image whose size has been changed during the changing of the size, and calculating an exposure on the basis of the predetermined brightness component; and controlling a shutter speed and/or an iris of a lens on the basis of the calculated exposure. Extracting a predetermined brightness component of a size changed image may comprise calculating a plurality of brightness values for a plurality of pixels of the size changed image and determining a highest brightness value of the plurality of brightness values.

According to another aspect of the present invention, one or more of the foregoing image processing methods may be embodied by a computer readable media such that the methods may be executed on a computer, imaging device or other electronic device known in the art.

DETAILED DESCRIPTION OF THE EMBODIMENTS

The present invention will now be described more fully with reference to the accompanying drawings, in which exemplary embodiments of the invention are shown. Like reference numerals in the drawings denote like elements, and thus descriptions of like elements will not be repeated.

Figure 1:
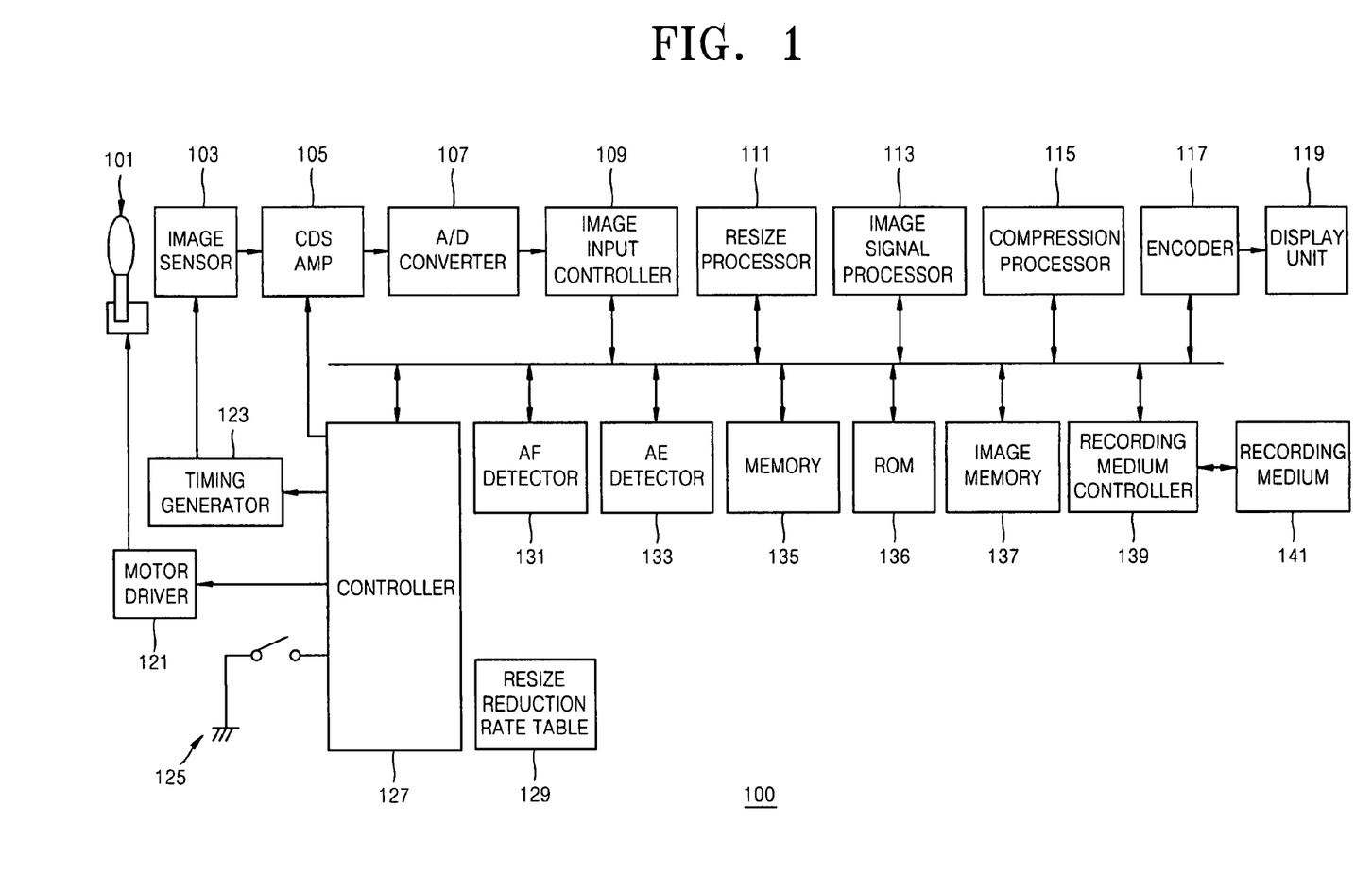
FIG. 1 is a schematic block diagram of an example imaging device according to an embodiment of the present invention.

FIG. 1 is a schematic block diagram of an example imaging device 100 according to an embodiment of the present invention.

Referring to FIG. 1, the imaging device 100 includes: a focusing lens 101; an image sensor 103; a correlated double sampling amplifier (CDSAMP) 105; an analog/digital (A/D) converter 107; an image input controller 109; a resize processor 111 or a size changer; an image signal processor 113; a compression processor 115; an encoder 117; a display unit 119; a motor driver 121; a timing generator 123; a switch 125; a controller 127, which may include a magnification changing rate obtaining unit; a resize reduction rate table 129; an automatic focus (AF) detector 131 or an AF controller; an automatic exposure (AE) detector 133; a memory 135; a read-only memory (ROM) 136; an image memory 137; a recording medium controller 139; and a recording medium 141.

Also as shown, the image input controller 109, the resize processor 111, the image signal processor 113, the compression processor 115, the encoder 117, the controller 127, the AF detector 131, the AF detector 133, the memory 135, the ROM 136, the image memory 137, and the recording medium controller 139 may be connected to a bus.

The focusing lens 101 is a lens that focuses on an object to be photographed with a predetermined shooting magnification, but the present embodiment of the invention is not limited thereto.

Also, the focusing lens 101 may include a plurality of focusing lenses or other kinds of lenses (e.g., other than focusing lenses). Also, although the image sensor 103 may be a charged coupled device (CCD) or a complementary metal oxide semiconductor (CMOS), the image sensor is not limited thereto.

Also, an object to be photographed may be an object such as a human being, an animal, an item, and a building with a high frequency. In more detail, an object may be a vertical pattern, hair, or a thin film, but the object is not limited thereto.

The CDS AMP 105 removes AMP noises or reset noises of the image sensor 103. The CDS AMP 105 operates on the basis of CDS, adds a gain to a photograph signal from the image sensor 103, and outputs an image signal to the A/D converter 107.

The image signal processor 113 converts each of input red, green, blue image signals (or image data) into a YC image signal (or image data) and outputs the YC image signal. Also, a Y signal is a brightness signal, and a C signal is a color signal. An image in the present embodiment is one of a still image and a moving image, but the image is not limited thereto.

The compression processor 115 converts an input signal into a compressed image by coding the input image signal, and outputs the compressed image using a file type such as Joint Photographic Experts Group (JPEG). The output compressed image may be temporarily stored in the memory 135.

The switch 125 may operate as a shutter of the imaging device 100 by switching from 'OFF' to 'ON' and vice versa. Also, the switch 125 may be a button (shutter button) or a lever that can be actuated by a user who uses the imaging device 100, but the switch 125 is not limited thereto.

The controller (or CPU) 127 serves as an operation processing unit and a controlling unit. The controller 127 may control and/or coordinate operation of various parts or components of the imaging device 100 such as the image sensor 101, the recording medium controller 139, etc. Also, the controller 127 may drive and execute various programs such as firmware stored in a memory element such as the ROM 136. A processing subsystem may comprise the controller 127 in combination, cooperation and/or communication with any one or more of the image input controller 109, the resize processor 111, the image signal processor 113 (e.g., a DSP), the compression processor 115, the encoder 117, the resize reduction table 129 and the recording medium controller 139.

The controller 127 reads a resize reduction rate or a magnification changing rate stored in the resize reduction rate table 129 depending on a focal point of the focusing lens 101 and controls the motor driver 121 to drive the focusing lens 101.

The resize reduction rate table 129 is stored in a memory element such as the memory 135 or the ROM 136, but the storage of the resize reduction rate table 129 is not limited thereto.

The memory 135 is a synchronous dynamic random access memory (SDRAM), but the memory 135 is not limited thereto. For example, the memory 135 may be a dynamic random access memory (DRAM), a static random access memory (SRAM), or a random access memory RAM.

The image memory 137 is video random access memory (VRAM), and any storage element may be used as the image memory 137 as long as the image, memory 137 can store screen information for displaying on the screen.

The A/D converter 107 converts an input analog image signal into a digital image signal, and the digital image signal is temporarily stored in the memory 135 by the image input controller 109.

The resize processor 111 performs a resize process that changes (e.g., reduces) the size of an image of the digital image signal stored in the memory 135. The resize process performed by the resize processor 111 will be described later.

After the resize process has been performed by the resize processor 111 on a digital image signal, the resize-processed signal is transmitted to the image signal processor 113, which converts the digital image signal from an RGB image signal into a YC image signal. The YC image signal may be temporarily stored in the memory 135.

During a display process on a screen by the display unit 119, the YC image signal stored in the memory 135 is transmitted to the image memory 137, the digital image signal stored in the image memory 137 may be converted into screen data for displaying on the screen by the encoder 117, and the screen data may be displayed on the screen of the display unit 119.

The displaying of an image using the display unit 119 may be repeatedly or continuously performed regardless of an ON/OFF operation of the switch 125. That is, a through image (i.e., a preview or viewfinder-like image) may be displayed on the screen of the display unit 119 when the device 100 is operating in a photographing/recording mode. In this way, an object is continuously being photographed by the image sensor 103 such that the image is resized by the resize processor 111, the image is processed by the image signal processor 113, and the image is displayed on the screen continuously. A user may view an image displayed on the display unit 119 as a live image.

The display unit 119 is provided as a part of the imaging device 100, but the display unit 119 may be remote from the imaging device 100 and wired or wirelessly connected thereto.

The AF detector 131 performs an AF control process or AF detection process on an image resized by the resize processor 111. Similarly, the AE detector 133 performs an AE control process or AE detection process on an image resized by the resize processor 111. Detailed descriptions of the AF detector 131 and the AE detector 133 will be described later.

The AF detector 131 and the AE detector 133 respectively perform the AF detection process and the AE detection process at a predetermined time, and the display unit 119 may display an image after the AF detection and AE detection processes are performed.

When an image is recorded on the recording medium 141, data of a YC image signal stored in the memory 135 may be converted into a file type such as JPEG by the compression processor 115. The file-type converted data may be input to the recording medium controller 139 and recorded on the recording medium 141.

Also, the recording medium 141 may be a flash memory such as electrically erasable and programmable read only memory (EEPROM), but the recording medium 141 is not limited thereto and may be an optical disk such as digital versatile disks (DVD)-ROMs, CD-ROMs, a magnetic disk such as hard disks, as well as other storage media known in the art.

Figure 2:
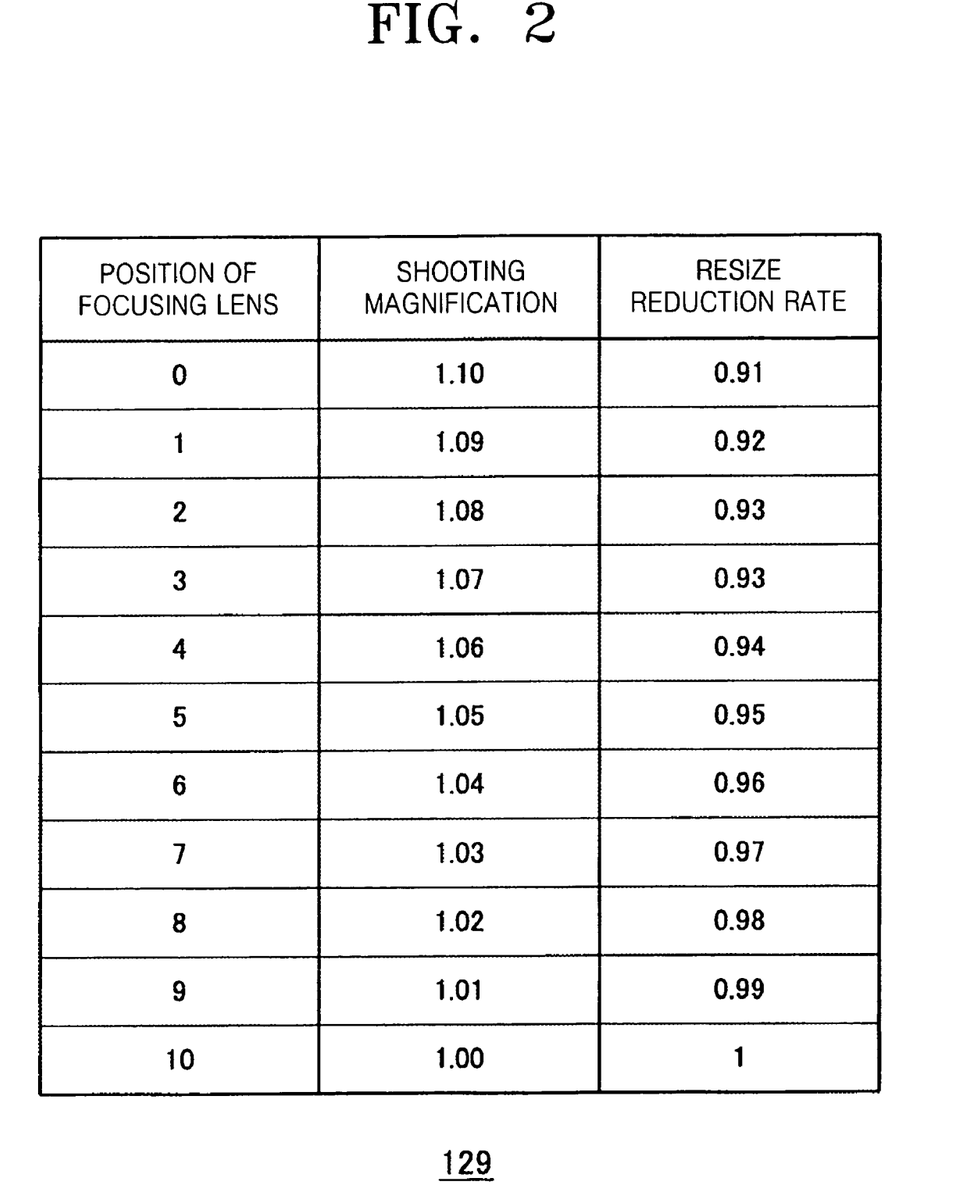
FIG. 2 is a view illustrating an example table of resize reduction rate according to an embodiment of the present invention.

FIG. 2 is a view illustrating an example table of resize reduction rate according to an embodiment of the present invention. Referring to FIG. 2, a table 129 or data structure associates resize reduction rates for each focusing position 0-10, which represent focal points of the focusing lens, of the focusing lens. The resize reduction rate may be indirectly proportional to the shooting magnification for each position of the focusing lens.

Resize reduction rates are calculated such that an angle of view is kept constant as the focusing lens moves to each position.

As shown in table 129, as the position number of the focusing lens increases, the shooting magnification decreases, but such an inverse relationship may not be necessarily required. Although eleven focusing positions (i.e., 0 through 10) are shown, fewer or additional positions may be provided. As can be appreciated, the focusing lens is preferred to have at least two focusing positions.

In one example, the number of positions of the focusing lens may be 101 such that the focusing lens is configured to move to positions 0-100. In another example, the number of positions of the focusing lens may be just two (2) positions such that the focusing lens is configured to move between positions 0 and 1.

Referring to FIG. 2, the resize reduction rate is determined depending on the focal point of the focusing lens, and the resize processor 111 performs the resize process by adjusting the size of an image on the basis of the resize reduction rate.

The resize reduction rate table 129 is a table where resize reduction rates reducing the size (or an image range) of an image are determined for each position of the focusing lens, but the resize reduction rate table 129 is not limited thereto. For example, the resize reduction rate table 129 may be a resize enlarging rate table where resize enlarging rates are determined for each position of the focusing lens.

Figure 3:
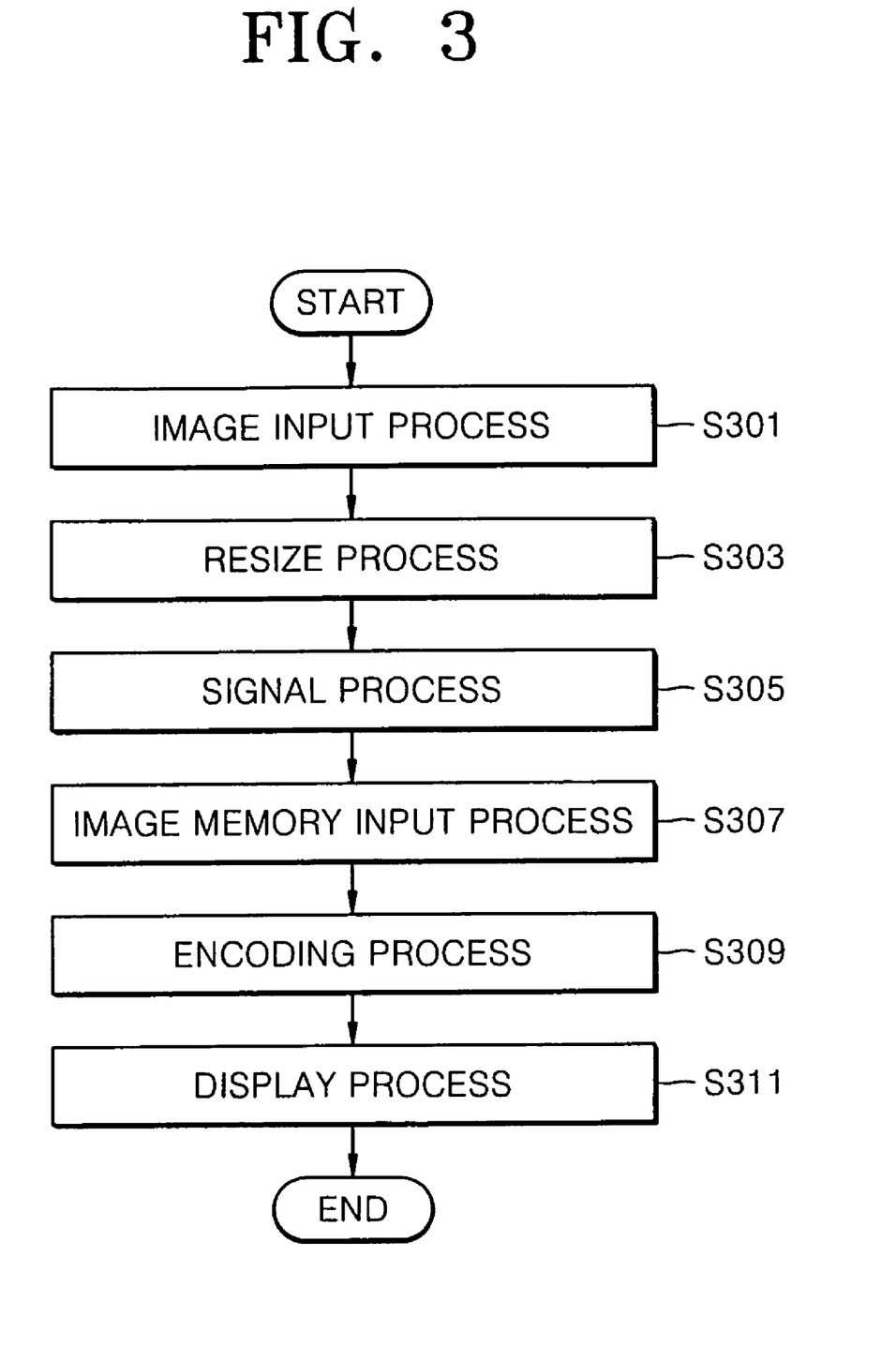
FIG. 3 is a flowchart of an example image displaying method in an imaging device according to an embodiment of the present invention.
Figure 4:
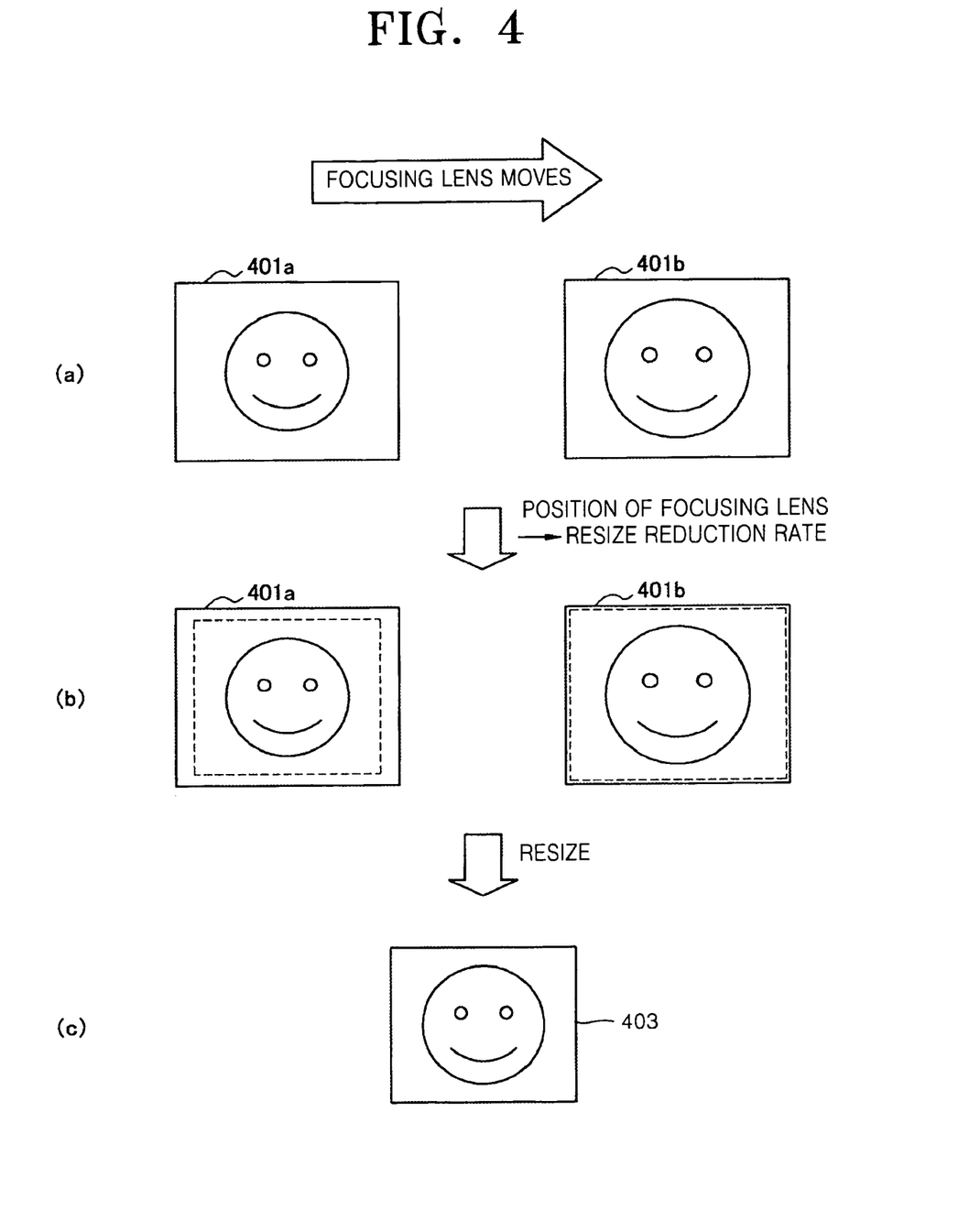
FIG. 4 is a schematic view illustrating an example resize process of an imaging device according to an embodiment of the present invention.

FIG. 3 is a flowchart of an example image displaying method of the imaging device 100 according to an embodiment of the present invention, and FIG. 4 is a schematic view illustrating an example resize process of the imaging device 100 according to an embodiment of the present invention.

Referring to FIG. 3, the imaging device 100 performs an image input process (S301). During the image input process, light is incident onto the image sensor 103 through the focusing lens 101 such that the image sensor 103 generates a photograph signal that is sampled by the CDSAMP 105, and which outputs an image signal to the A/D converter 107.

When receiving the image signal from the CDS AMP 105, the A/D converter 107 converts the image signal from analog to digital, and outputs the digital image signal to the image input controller 109. The image input controller 109 inputs the digital image signal to the memory 135 to temporarily store the digital image signal in the memory 135. By doing so, the image input process S301 is ended.

Then, the resize processor 111 obtains the digital image signal stored in the memory 135 by the image input controller 109, and performs a resize process on an image of the digital image signal.

The resize process S303 will be described in more detail with reference to FIG. 4. Referring to the upper side-by-side image comparison (a) of FIG. 4, an object of an image 401b is illustrated as being bigger than that of an image 401a when the image sensor 103 photographs the object. That is, an image range or an image size of an object in the image 401b is bigger than that of an object in the image 401a because the position of the focusing lens is 10 (FIG. 2) for the image 401a and the position of the focusing lens is 0 for the image 401b. Thus, the shooting magnifications are different for the images 401a and 401b.

Referring to the lower side-by-side image comparison (b) of FIG. 4B, an image 401a corresponds to a case where the position of the focusing lens is 10 (FIG. 2) such that the resize reduction rate obtained from the resize reduction rate table 129 by the controller 127 is 1. As such, the resize processor 111 directly outputs a portion (dotted line) that excludes the margin of the image signal. That is, the resize processor 111 outputs an image portion inside an image outline (a dotted line) representing an image range.

Referring to FIG. 4B, an image 401b corresponds to a case where the position of the focusing lens illustrated in FIG. 2 is 0, the resize reduction rate obtained from the resize reduction rate table 129 by the controller 127 is 0.91, and the resize processor 111 reduces and outputs a portion (dotted line) that excludes the margin of the image signal. That is, the resize processor 111 performs a resize process (0.91 times reduction) on an image portion inside an image outline (a dotted line) representing an image range and outputs the same.

That is, the image range in the object of the image 401b is reduced by a greater degree than a degree by which the image range in the object of the image 401a is reduced, so that the image ranges in the two objects can be the same.

Therefore, when the images 401a and 401b illustrated in FIG. 4 side-by-side image comparison (b) are resized by the resize processor 111, an image 403 having a constant angle of view is output for the two objects as illustrated in FIG. 4 portion (c).

When the resize process S303 is ended, the image signal processor 113 reads the digital image signal that has been resized by the resize processor 111 from the memory 135, and converts the digital image signal consisting of the RGB image signal into an image signal consisting of the YC image signal (S305).

After that, the image signal processor 113 provides the image signal consisting of the YC image signal to the image memory 137 (S307).

Next, the encoder 117 encodes the image signal stored in the image memory 137 so that the image signal may be displayed on the screen of the display unit 119, and outputs the encoded image signal to the display unit 119 (S309).

The display unit 119 outputs the encoded image signal transmitted from the encoder 117, thereby displaying an image or a through image on the screen (S311).

As previously mentioned, the imaging device 100 displays a continuous preview/viewfinder-like image (previously referred to as "through image") on a screen display generated on the basis of a photograph signal from the image sensor 103 by using the display unit 119, thereby displaying an image as a live image on the display unit 119. Furthermore, the display unit 119 responds to the user-actuation of the switch 125, which corresponds to the shutter button, by displaying a captured, still image.

The through image is displayed after being resized (S303) using a resize reduction rate that corresponds to a position at which the focusing lens is positioned.

Therefore, when a position of the focusing lens changes during an AF operation, a resize reduction rate changes depending on a change of a focal distance of an entire lens system provided to the imaging device 100, and thus, an angle of view or a magnification of a through image is maintained constant.

Also, though not shown in FIG. 3, when the switch 125 of the imaging device 100 is changed to ON, shooting preparation operations such as an AF detection process and an AE detection process are performed, and a focusing position of the focusing lens 101 and appropriate exposure for shooting a snap shot are calculated. When the focusing position of the focusing lens 101 is calculated, the motor driver 121 drives the focusing lens 101 up to the focusing position.

Also, when the image sensor performs an exposure operation according to a predetermined exposure and performs photoelectric conversion to output a photograph signal, the photograph signal is: 1) converted into a YC image signal; 2) compressed as a file type such as JPEG; and 3) recorded as an image in the recording medium 141 in subsequent processes.

Also, in the image displaying method illustrated in FIG. 3, the resize process S303 may be performed at a predetermined time regardless of an ON/OFF status of the switch 125 such that the shooting preparation operations (the AF detection process and AE detection process) may be performed thereafter.

Figure 5:
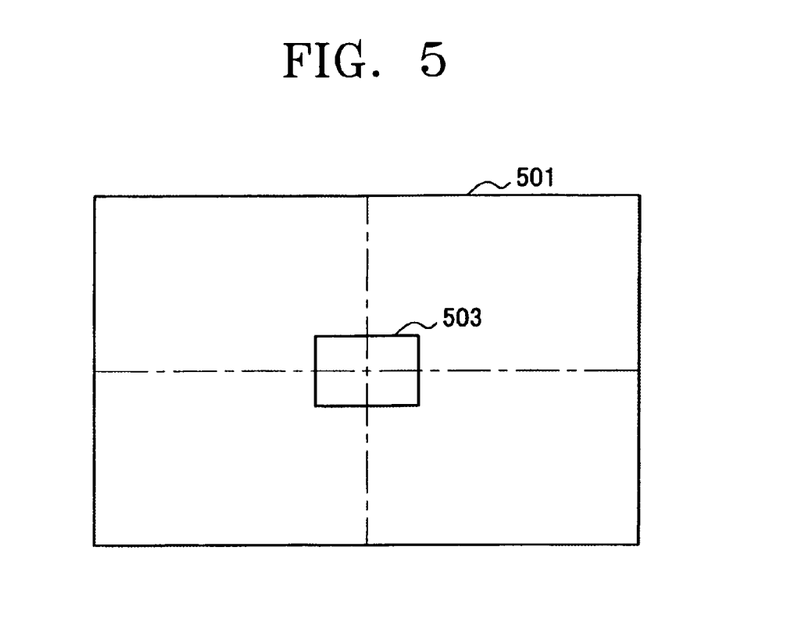
FIG. 5 is a schematic view illustrating an image range (or image region) and an automatic focus (AF) range or AF region.
Figure 6:
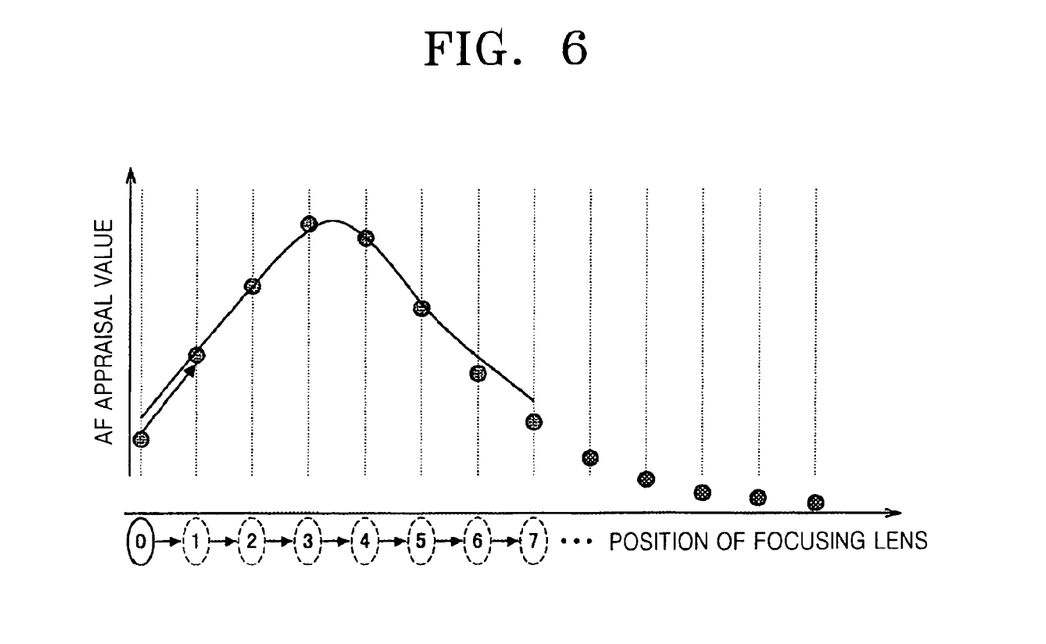
FIG. 6 is a schematic view illustrating an example AF detection process.

Turning now to FIGS. 5 and 6, FIG. 5 is a schematic view illustrating an image range (or image region) and an AF range (or AF region), and FIG. 6 is a schematic view illustrating an AF detection process. Referring to FIG. 5, when shooting of a snap shot is performed or an image is displayed on a screen, an image range 501 representing a range of an image and an AF range 503 representing an AF detecting range exist. Also, the image range 501 may be described as an image outline or border.

The AF detection process is a process determining an appropriate focal point to focus on an object oriented by the user to be in the AF range 503. Although the AF range 503 as shown in FIG. 5 is illustrated to be located at a central portion of the image range 501, the AF range 503 may alternatively be located at any position inside the image range 501. Also, although one AF range 503 is shown in FIG. 5, fewer or additional AF ranges (e.g., a plurality of AF ranges 503) may be provided in the image range 501.

Referring to FIG. 6, during the AF detection process, AF appraisal values are calculated for the AF range 503 according to each position of the focusing lens (e.g., starting from position "0" and continuing to subsequent positions) so that an optimum focal point is obtained on the basis of the highest AF appraisal value from a plurality of calculated AF appraisal values.

In more detail, referring to FIG. 6, the AF appraisal values have the highest value in the vicinity of a position "3" of the focusing lens. That is, a focal point is obtained on the basis of an AF appraisal value located in the vicinity of a position "3" of the focusing lens, and the focusing lens 101 is changed to the obtained focal point. Also, the calculating of the AF appraisal value will be described later.

Figure 7:
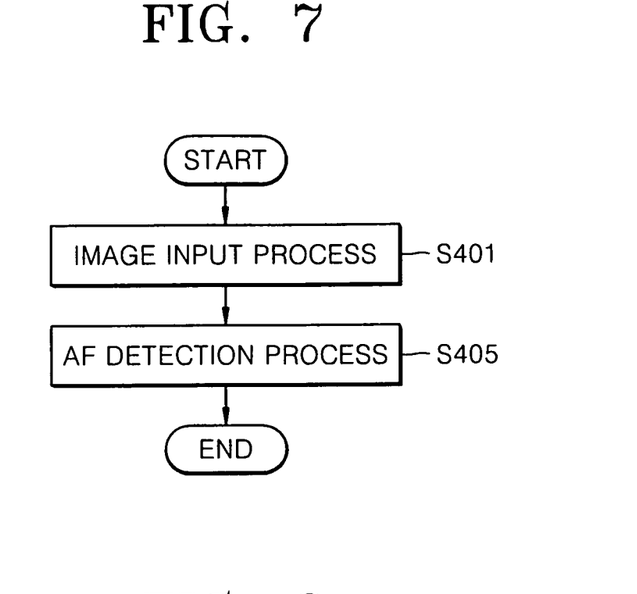
FIG. 7 is a flowchart illustrating an example AF detection process of an imaging device according to an embodiment of the present invention.
Figure 8:
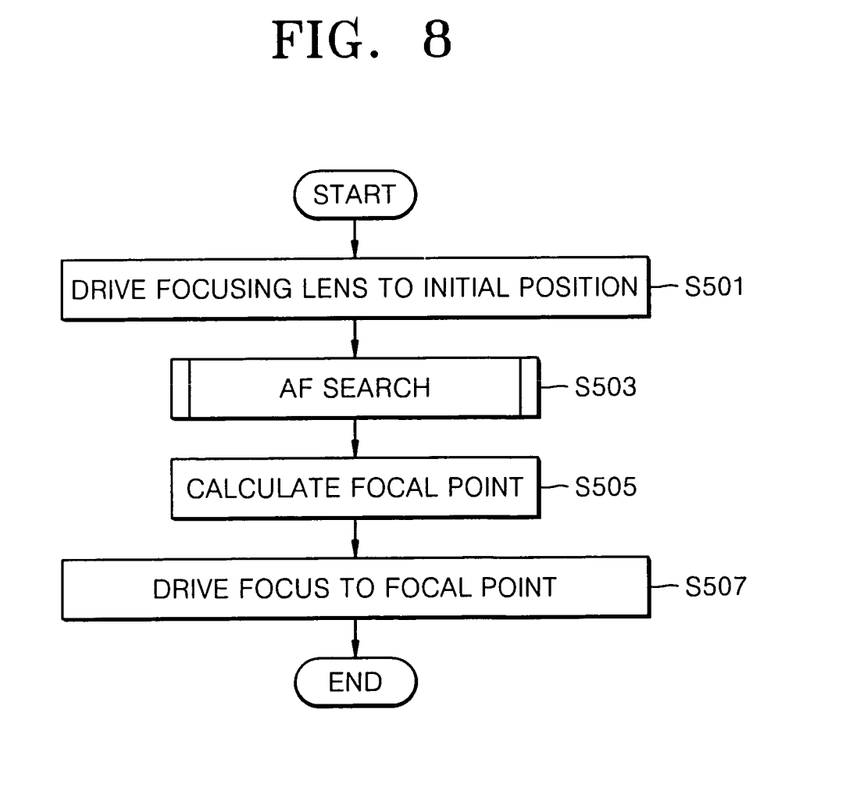
FIG. 8 is a flowchart illustrating an example AF detection process of an imaging device according to another embodiment of the present invention.
Figure 9:
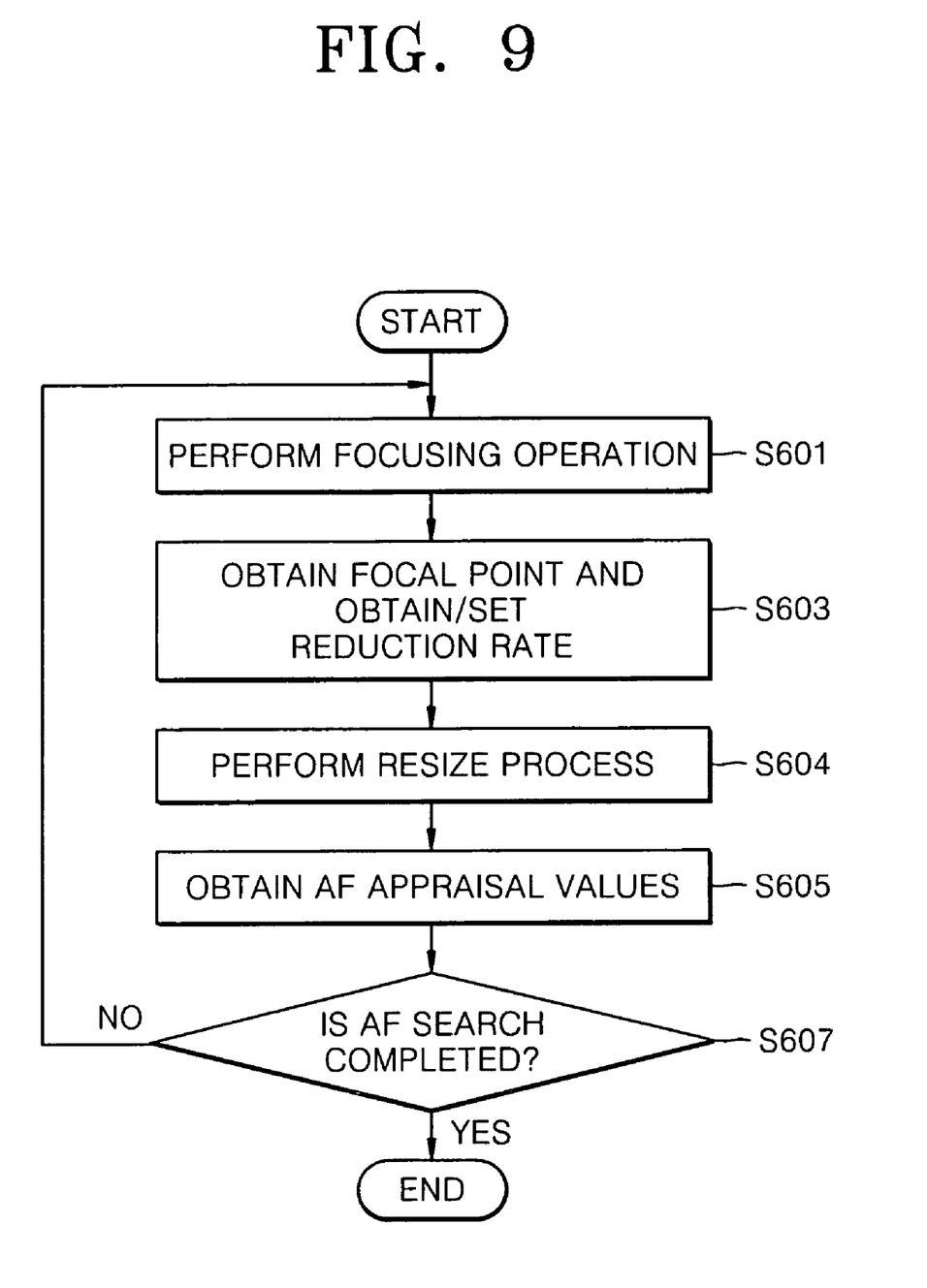
FIG. 9 is a flowchart illustrating an example AF detection process of an imaging device according to another embodiment of the present invention.

FIGS. 7 and 8 are flowcharts illustrating an example AF detection process of an imaging device according to an embodiment of the present invention, and FIG. 9 is a flowchart of an example AF detection process by an imaging device according to another embodiment of the present invention. The AF detection process by the imaging device 100 will be described with reference to FIGS. 7 through 9.

Referring to FIG. 7, the imaging device 100 performs an image input process S401. Also, since the image input process S401 is substantially the same as the above-described image input process S301, a detailed description thereof will be omitted.

When the image input process S401 is performed, the AF detection process by the AF detector 131 is performed (S405) in the imaging device 100. The AF detection process S405 will be described in more detail below with reference to FIG. 8.

Referring now to FIG. 8, during the AF detection process S405, the imaging device 100 performs steps S501-S507. In step S501, the controller 127 controls the motor driver 121 to drive the focusing lens up to an initial position. The initial position may be a position "0" of the focusing lens illustrated in FIG. 2, but the initial position is not limited thereto.

After step S501, the imaging device 100 performs in step S503 an AF search process. The AF search process S503 will be described in detail with reference to FIG. 9.

Referring now to FIG. 9, during the AF search process S503, the imaging device 100 performs steps S601-S607. In step S601, the focusing lens 101 is driven up to a next position of the focusing lens. In instances, when the focusing lens 101 is not located in the initial position (S501, FIG. 8), an operation S601 may not be performed and instead a next operation (S603) may be performed.

The controller 127 obtains a position at which the focusing lens 101 is located when the driving of the focusing lens 101 is ended.

The controller 127 refers to the resize reduction rate table 129 (FIG. 2) on the basis of the obtained position of the focusing lens to obtain a resize reduction rate that corresponds to the obtained position, and outputs/sets the obtained resize reduction rate to the resize processor 111 (S603).

Next, the resize processor 111 performs a resize process on an image stored in the memory 135 on the basis of the resize reduction rate set by the controller 127 (S604). Also, the resize processor 111 reduces an image range or image size by a resize reduction rate, but the resize processor 111 is not limited thereto.

Also, since the resize process S604 is substantially similar as the above-described resize process S303, a detailed description thereof will not be repeated for brevity.

When the resize process (S604) by the resize processor 111 is ended, the AF detector 131 obtains an AF appraisal value on the basis of the resized image signal (S605).

During the obtaining of the AF appraisal value (S605), an AF appraisal value for a predetermined region (FIG. 5, AF range 503) is obtained on the basis of an image signal reduced by the resize processor 111.

Also, the AF appraisal value may be determined, calculated or otherwise obtained by extracting a high frequency component of the AF range from the image signal and integrating the extracted high frequency component over all pixels constituting the AF range 503.

When the AF detector 131 obtains the AF appraisal value (S605), the controller 127 determines in step S607 whether the AF search process S503 is ended.

In an embodiment, when AF appraisal values are being obtained for all positions of the focusing lens (e.g., from an initial position to an end position), if the AF appraisal values being obtained continue to decrease successively many times, the controller 127 may determine that the AF search process S503 is ended prematurely before obtaining AF appraisal values for all positions such that the AF search process S503 is performed more quickly.

Also, an AF appraisal value of each position of the focusing lens is provided and stored in the memory 135 by the controller 127.

Referring back now to FIG. 8, when the AF search process S503 is ended, the imaging device 100 calculates a focal point represented by the AF range 503 on the basis of the position of the focusing lens that corresponds to the highest AF appraisal value of the AF appraisal values stored in the memory 135 (S505), and drives the focusing lens 101 up to the focal point (S507). By doing so, the AF detection process is ended.

According to the foregoing-described AF detection process, a pseudo peak, which may be generated when shooting magnifications are the same and objects are the same, may be prevented. That is, malfunction of the AF detection process can be prevented. Also, the AF detection process shows a particularly excellent performance when an object is a vertical pattern, hair, or a thin film, but the object is not limited thereto. The pseudo peak will be described later.

Figure 10A:
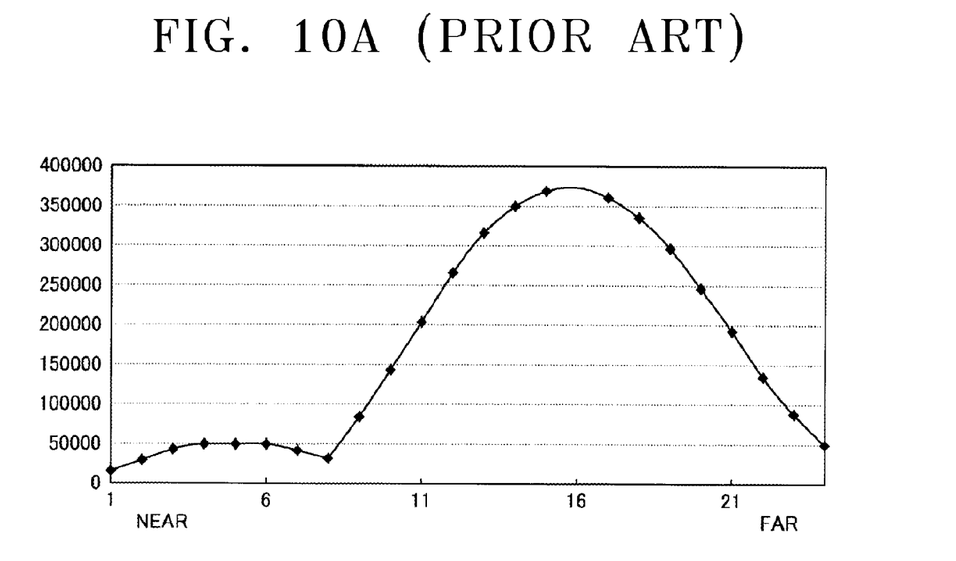
FIGS. 10A and B are a graph and a view illustrating an example of a performance result of a conventional AF detection process.
Figure 10B:
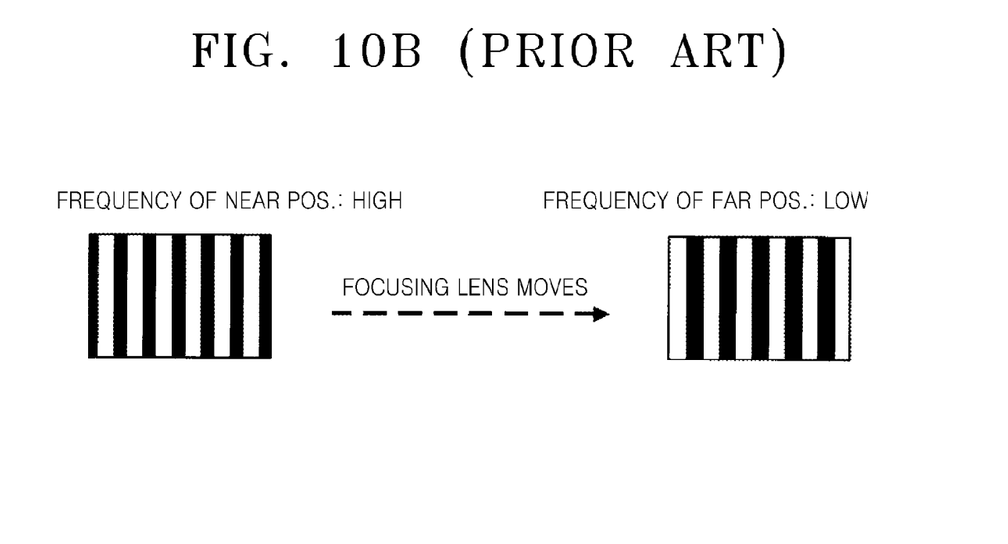
Figure 11A:
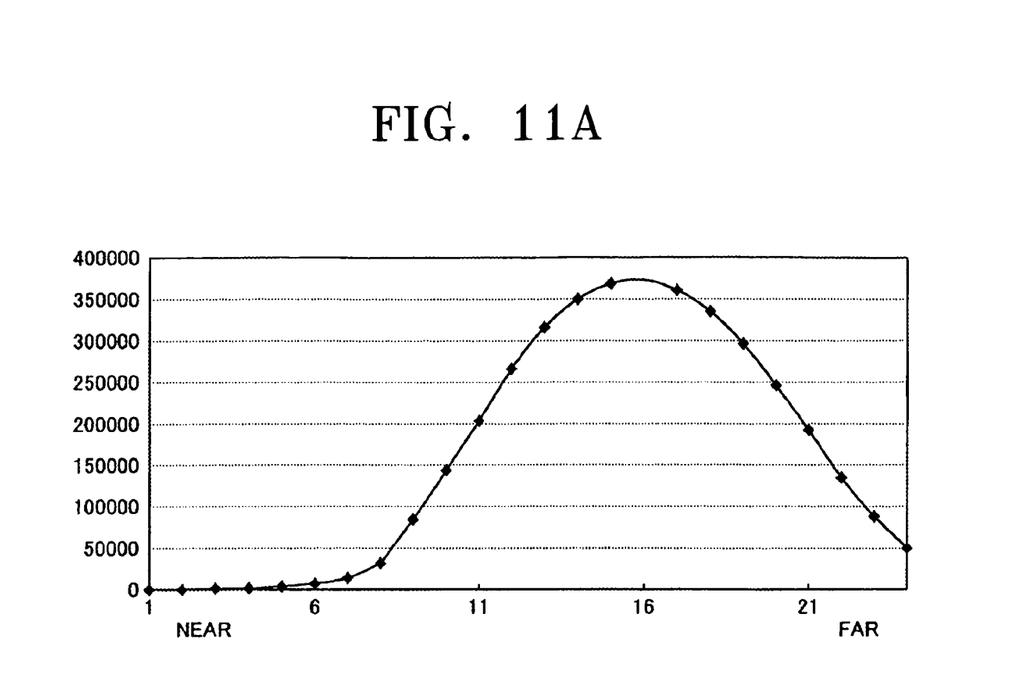
FIGS. 11A and B are a graph and a view illustrating an example of a performance result of an example AF detection process according to an embodiment of the present invention.
Figure 11B:
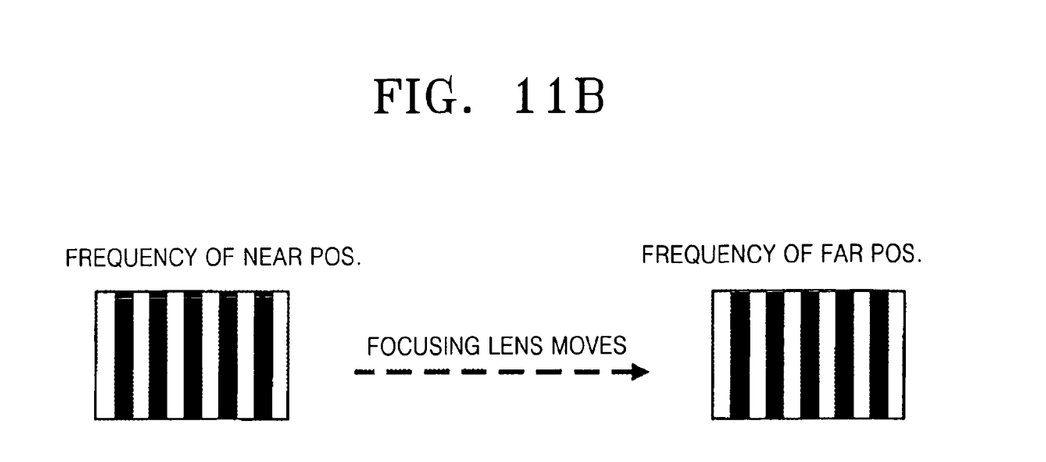

FIG. 11A and 11B are a graph and a view illustrating an example of transitions in AF appraisal values of an AF detection process according to the present invention. For comparison with FIGS. 11A and 11B, 10A and 10B are a graph and a view illustrating an example of transitions in AF appraisal values of a conventional AF detection process.

Referring first to FIG. 10A, a focal distance of an entire lens system that depends on movements of the focusing lens and that is provided to an imaging device varies, transitions in AF appraisal values by the conventional AF detection process have one peak between a position "1" and a position "6" of the focusing lens in the horizontal axis, and another peak between a position "11" and a position "21" of the focusing lens in the horizontal axis. The vertical axis represents AF appraisal values.

The shooting magnification of the focusing lens 101 is relatively low for a range between the position "1" and the position "6" compared to shooting magnification of the focusing lens 101 for a range between the position "11" and the position "16", so that the density of a black and white vertical pattern photographed as an object is high as illustrated in FIG. 10B. That is, the frequency of an image signal is high.

Therefore, when the focusing lens 101 moves between the position "1" and the position "6", a frequency change (high and low) of an image signal is generated and an AF appraisal value changes depending on the frequency change to generate a pseudo peak.

Two peaks are generated and, because of the generated pseudo peak, shooting magnification of the focusing lens 101 is different depending on the position of the focusing lens. In the conventional AF detection process, there is a problem in that a position of the focusing lens that corresponds to a pseudo peak is falsely determined as an appropriate focal point due to the generation of the pseudo peak.

Referring to FIG. 11A, transitions in AF appraisal values by the AF detection process according to the present invention have only one peak between a position "11" and a position "21" of the focusing lens in the horizontal axis. The vertical axis represents AF appraisal values.

The reason why only one peak exists, as illustrated in FIG. 11A, is because an image is resized, and thus, reduced according to the position of the focusing lens when an AF detection process is performed so that an angle of view is maintained constant for an image focused at any position of the focusing lens as illustrated in FIG. 11B. Also, an angle of view is maintained constant for a frequency of an image signal focused at any position of the focusing lens.

From the above description and according to the AF detection process of the present invention, the generation of a problematic pseudo peak of the conventional art can be prevented, and thus, a possibility that a focal point can be falsely determined is prevented.

Figure 12:
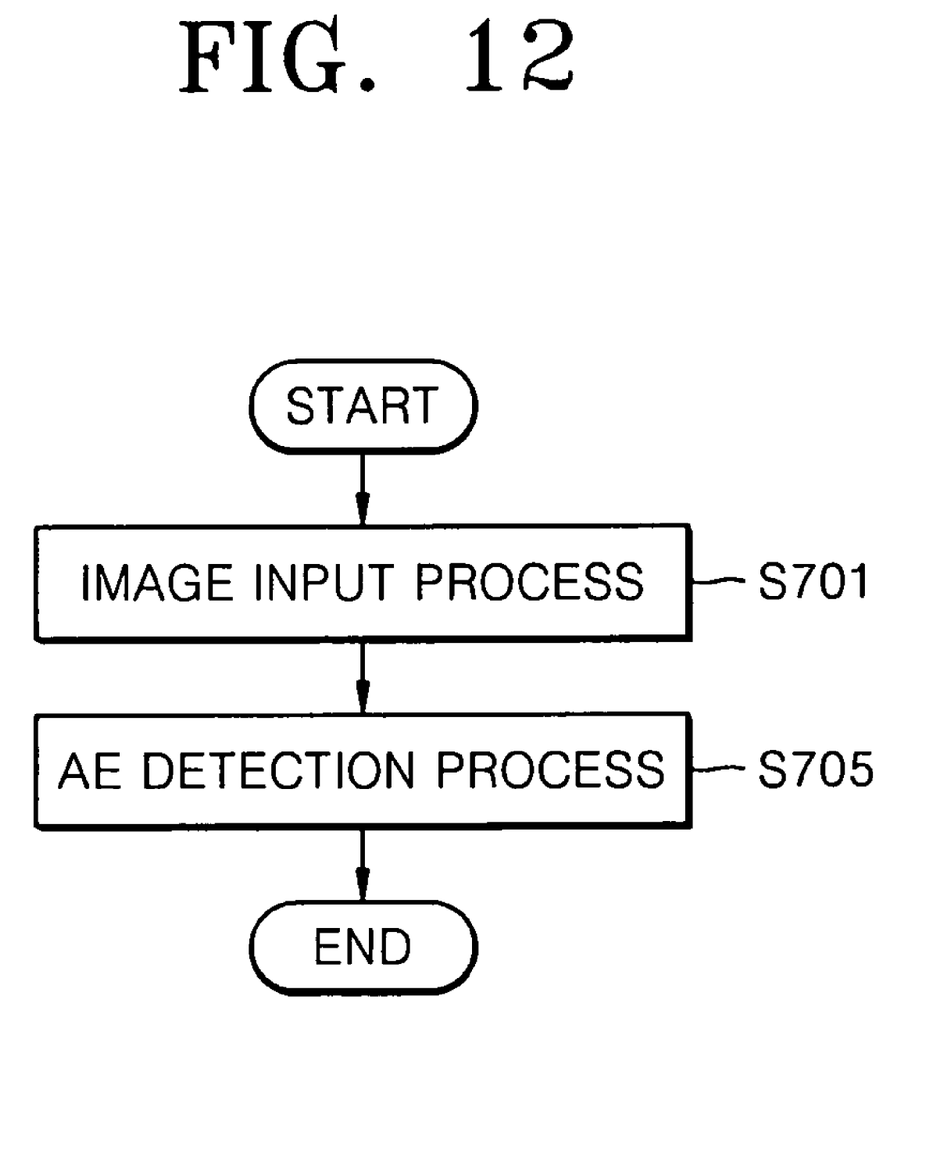
FIG. 12 is a flowchart illustrating an example AF detection process of an imaging device according to another embodiment of the present invention.

FIG. 12 is a flowchart illustrating an AE detection process of an imaging device according to another embodiment of the present invention. Referring to FIG. 12, the imaging device 100 performs an image input process S701. Also, since the image input process S701 is substantially similar to the image input process S301, a detailed description thereof will not be repeated for brevity.

When the image input process S701 is performed, the imaging device 100 performs an AE detection process S705 using the AE detector 133. The AE detection process S705 will be described in more detail.

Like the above-described AF detection process S405, brightness values Y for all pixels constituting an image are calculated on the basis of an image signal, which may be RGB data, photographed at one of the positions of the focusing lens and resize-process. Brightness values are calculated using the following Equation 1:

$$Y=0.299R+0.587G+0.114B$$

When a brightness value is determined for all the pixels constituting an image, the AE detector 133 may integrate the individual pixel brightness values Y over an entire range of the image.

The controller 127 controls an iris and an electronic shutter speed such that the integration value of the brightness values Y is maintained constant.

As can be appreciated, the above-described process may be performed using hardware or software. When the process is performed using software, a program containing the software is installed in an information processing apparatus such as a general purpose computer and a microcomputer, and the information processing apparatus is operated as the imaging device 100.

The program may be recorded on a computer-readable media such as a hard disk, ROM or other device known in the art for execution by a computer or other electronic device.

Also, the program may be temporarily or permanently recorded (stored) on removable recording media such as flexible disks, compact disc (CD)-ROMs, magneto optical (MO) disks, digital versatile discs (DVDs), and magnetic disks as well as a hard disk drive (HDD). The removable recording media may be provided as a so-called package software.

Also, besides installing of the program from the removable recording media to a computer, the program may be wirelessly transmitted to the computer from a download site by means of an artificial satellite for digital satellite broadcasting, or the program may be transmitted to the computer through a wired line such as local area network (LAN) and a network such as the Internet. The computer may receive the transmitted program and install the received program in a built-in memory 135.

Operations realized as the program allowing a computer to perform various processes do not necessarily need to perform the processes according to a time series, and the operations may be performed in parallel or separately (for example, the operations may be performed through a parallel process or a process by an object).

Also, the program may be executed by one computer and may be distributed over a plurality of computers and executed in a distributed fashion.

In the above description, respective parts provided to the imaging device 100 are hardware, but the present invention is not limited thereto. For example, at least one of the resize processor 111, the image signal processor 113, the compression processor 115, the encoder 117, the AF detector 131, and the AE detector 133 may be a program consisting of a plurality of modules or components.

As described above, according to the present invention, it is possible to maintain a constant angle of view of an image photographed by an imaging device, and achieve a miniature, a light-weight, and a slim imaging device instead of utilizing a large-scale lens to maintain a constant angle of view.

Aspects of the present invention can be applied to digital still cameras, digital video cameras, cellular phones having a snap shot function, and a portable terminal having a snap shot function.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device comprising:
 a focusing lens that focuses on an object;
 an image sensor that receives from the focusing lens a focused light reflected from the object, the image sensor converting the focused light to an image signal for reproducing an image of the object;
 a lens driver that moves the focusing lens to a plurality of focal points; and
 a processor subsystem in communication with the lens driver and the image sensor, the processor subsystem including
  a magnification-changing unit that obtains a magnification changing rate for each focal point of the plurality,
  a size changer unit that changes a size of the image of the object according to the magnification changing rate, and
  an automatic focus module that extracts a predetermined frequency component of a size-changed image that is output from the size changer unit and determines an optimal focal point of the focusing lens according to the predetermined frequency component;
 wherein the processor subsystem maintains constant a view angle for each image photographed of the object at each focal point of the focusing lens.

2. The imaging device of claim 1 further comprising an output unit that outputs a size-changed image provided by the size changer.

3. The imaging device of claim 2 wherein the output unit is a display screen that displays the size-changed image.

4. The imaging device of claim 1 wherein the predetermined frequency component is a high frequency component of the image signal.

5. The imaging device of claim 4 wherein the automatic focus module further comprises a memory, the automatic focus module storing in the memory a plurality of high frequency components relative to the plurality of focal points, and wherein the processor subsystem determines the optimal focal point according to a highest high frequency component of the plurality of high frequency components.

6. An imaging device comprising:
a focusing lens that focuses on an object;
an image sensor that receives from the focusing lens a focused light reflected from the object, the image sensor converting the focused light to an image signal for reproducing an image of the object;
a lens driver that moves the focusing lens to a plurality of focal points; and
a processor subsystem in communication with the lens driver and the image sensor, the processor subsystem including
a magnification-changing unit that obtains a magnification changing rate for each focal point of the plurality,
a size changer unit that changes a size of the image of the object according to the magnification changing rate, and
an automatic exposure controller that extracts a predetermined brightness component of a size changed image being output from the size changer, said automatic exposure controller automatically calculating an exposure according to the predetermined brightness component;
wherein the processor subsystem maintains constant a view angle for each image photographed of the object at each focal point of the focusing lens.

7. The imaging device of claim 6 wherein the automatic exposure controller calculates brightness values of all pixels constituting the size changed image, integrates the calculated brightness values to calculate an integrated value, and determines the exposure such that the integrated value is maintained constant.

8. A digital camera comprising:
a focusing module including a focusing lens and a lens driver, the lens driver moving the focusing lens along a plurality of positions to focus an object at a plurality of focal points;
an image sensor that receives from the focusing lens a focused light reflected from the object, the image sensor converting the focused light to an image signal for reproducing an image of the object; and
a processor subsystem in communication with the lens driver and the image sensor, the processor subsystem including
a magnification-changing unit that obtains a magnification changing rate for each focal point of the plurality,
a size changer unit that changes a size of the image of the object according to the magnification changing rate, and
an automatic focus module that determines an optimal position for the focusing lens by extracting, at each position of the plurality, a predetermined frequency component of a size changed image that is output from the size changer unit and comparing the predetermined frequency component at each position of the plurality;
wherein the processor subsystem maintains constant a view angle for each image photographed of the object at each position of the plurality of positions.

9. The digital camera of claim 8 wherein the predetermined frequency component is a high frequency component of the image signal.

10. The digital camera of claim 9 wherein the automatic focus module further comprises a memory, the automatic focus module storing in the memory a plurality of high frequency components relative to the plurality of positions, and wherein the processor subsystem determines the optimal position according to a highest high frequency component of the plurality of high frequency components.

11. The digital camera of claim 8 further comprising an automatic exposure controller that extracts a predetermined brightness component of the size changed image being output from the size changer, said automatic exposure controller automatically calculating an exposure according to the predetermined brightness component.

12. The digital camera of claim 11 wherein the automatic exposure controller calculates brightness values of all pixels constituting the size changed image, integrates the calculated brightness values to calculate an integrated value, and determines the exposure such that the integrated value is maintained constant.

13. An image processing method for an imaging device including a focusing lens having a plurality of focal points, the method comprising:
obtaining a magnification changing rate for each focal point of the plurality such that an angle of view is maintained constant for each image photographed at each focal point of the plurality;
receiving an image signal relative to a captured image of an object at a focal point of the plurality;
changing a size of the captured image based on the magnification changing rate for the focal point of the captured image;
extracting a predetermined frequency component of a size changed image resulting from the changing step; and
determining an optimal focal point of the focusing lens according to the predetermined frequency component.

14. The method of claim 13, further comprising:
extracting a predetermined brightness component of the size changed image resulting from the changing step;
calculating an exposure according to the predetermined brightness component; and
controlling at least one of a shutter speed and an iris relative to the exposure resulting from the calculating step.

15. The method of claim 14 wherein the extracting a predetermined brightness component step comprises:
calculating a plurality of brightness values for a plurality of pixels of the size changed image; and
determining a highest brightness value of the plurality of brightness values.

16. The method of claim 14 wherein the extracting a predetermined brightness component step comprises:
calculating a plurality of brightness values for a plurality of pixels of the size changed image;
defining an auto-focus region of the size changed image that includes a pixel subset of the plurality of pixels; and
integrating brightness values relative to the pixel subset.

17. The method of claim 13 wherein the changing step comprises:
determining which focal point of the plurality was used to obtain the captured image;
determining a magnification of the captured image relative to the focal point which was used to obtain the captured image; and
adjusting the size of the captured image by an inverse of the magnification.

* * * * *

UNITED STATES PATENT AND TRADEMARK OFFICE
CERTIFICATE OF CORRECTION

PATENT NO. : 7,652,714 B2 Page 1 of 1
APPLICATION NO. : 11/545174
DATED : January 26, 2010
INVENTOR(S) : Yoshiharu Gotanda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-third Day of November, 2010

David J. Kappos
*Director of the United States Patent and Trademark Office*